United States Patent [19]
Maietta

[11] 3,933,117
[45] Jan. 20, 1976

[54] VEHICLE DISTRESS WARNING DEVICE

[76] Inventor: Peter J. Maietta, 609 E. Wheelock Parkway, St. Paul, Minn. 55101

[22] Filed: Nov. 4, 1974

[21] Appl. No.: 520,261

[52] U.S. Cl. .......... 116/28 R; 116/114 AJ; 116/173; 350/97
[51] Int. Cl.² ........................................ B60Q 1/26
[58] Field of Search ............ 116/28 R, 173, 114 AJ; 33/264; 350/97, 98, 109; 40/145 R, 129 C; 248/161; 403/107; 285/303; 280/289

[56] References Cited
UNITED STATES PATENTS

| | | | |
|---|---|---|---|
| 219,098 | 9/1879 | Jewell | 285/303 X |
| 479,909 | 8/1892 | Hurley | 285/303 X |
| 1,365,851 | 1/1921 | Reynolds | 285/303 X |
| 3,320,920 | 5/1967 | Lusebrink | 116/28 R |
| 3,421,473 | 1/1969 | Weichenrieder | 40/145 R |
| 3,433,203 | 3/1968 | Sharkey et al. | 116/28 R |

Primary Examiner—Richard C. Queisser
Assistant Examiner—Daniel M. Yasich
Attorney, Agent, or Firm—Marden S. Gordon

[57] ABSTRACT

A distress warning device intended for use on vehicles and the like and including a suction cup base with a telescopic mast affixed thereto and projecting upwardly therefrom and terminating in a hollow elongated cylindrically shaped ball member having hemispherical dome shaped ends and having its exterior surface coated with an iridescent reflective type paint so that the cylinder will be highly visible in both daylight and at night when subjected to light rays such as from a beam of light off an approaching vehicle.

1 Claim, 5 Drawing Figures

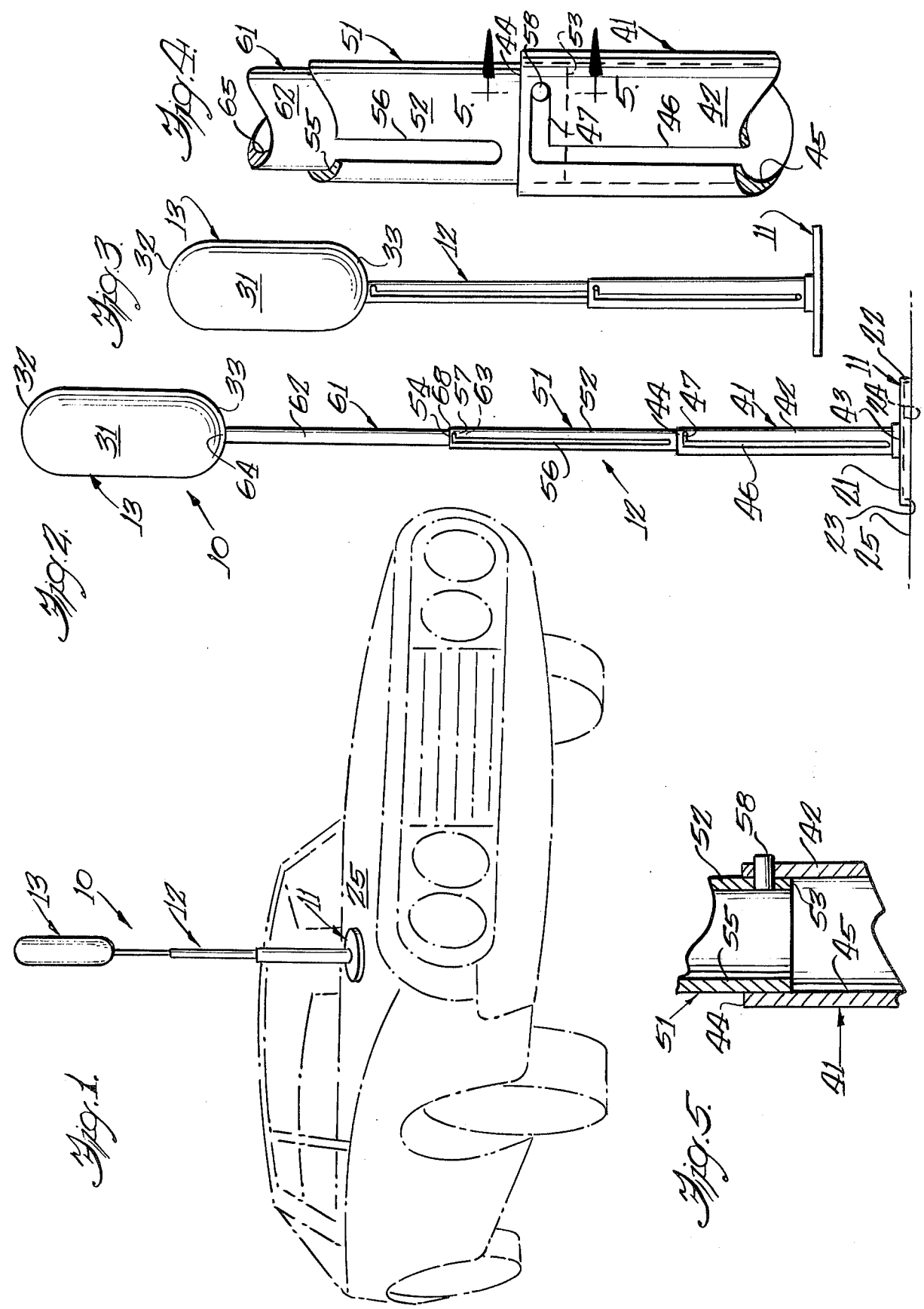

VEHICLE DISTRESS WARNING DEVICE

BACKGROUND OF THE INVENTION

1. Field of the Invention

This invention relates generally to vehicles and more particularly to a novel vehicle accessory device providing a distress warning signal adapted to be readily secured at any desired position on the vehicle by means of a suction cup base and projecting above the level of the vehicle to be clearly visible in all directions therearound. In addition, the distress warning device of the present invention is envisioned for use on boats, motorcycles, and any other form of conveyance wherein an individual may have need for using a distress type warning device signal.

2. Description of the Prior Art

Heretofore, distress warning and signalling devices for use in vehicles, boats, and other forms of conveyances have been relatively complex to use and expensive to manufacture thereby making their general acceptance among the consuming public somewhat less than desirable. Emergency signs and the like have heretofore taken many forms but generally they have included some type of sign designed to be attached to the conveyance and to convey a message indicating the nature of the distress.

Travel on the interstate highway systems throughout various countries requires that automobiles travel at a relatively high rate of speed, and it is often necessary that the driver of the vehicle on this type of highway system be on the alert for unexpected occurrences on the roadway ahead. One type of unexpected occurrence is the disabled vehicle along the side of the highway, or in some cases in the middle of the high speed lane of the roadway. It is not always possible for the driver of the oncoming vehicle to clearly discern whether the vehicle on the shoulder or on the highway is moving or standing still until he realizes that he is approaching the vehicle at a relatively fast closing rate. Thus, the driver of the oncoming vehicle must make a last minute effort to move to one side or the other of the highway to prevent colliding with the standing vehicle, this posing the risk of the moving vehicle striking a vehicle in an adjacent lane when having to take such defensive tactics. It would therefore be desirable to have a distress warning device clearly indicating to oncoming traffic that a distress condition exists so that such oncoming traffic can have sufficient time to take corrective action in a manner preventing injury and damage to both drivers and vehicles respectively.

SUMMARY OF THE INVENTION

The present invention recognizes the need for an operator of a conveyance to be able to signal of a distress condition either to warn other individuals away therefrom to avoid further complicating the distress condition or to signal the need for help by such individuals, and accordingly the present invention provides a novel solution thereto in the form of a compact and easily usable distress warning device having a suction cup base so that it may be readily attached at any desired portion of the conveyance, such as the roof of an automobile, the foredeck of a boat, and the like to clearly signal to all around of the distress condition.

It is a feature of the present invention to provide a distress warning device.

A further feature of the present invention provides a distress warning device which is relatively simple in its construction and which therefore may be readily manufactured at a relatively low cost and by simple manufacturing methods so that it may be retailed at a sufficiently low price to encourage widespread use thereof.

A further feature of the present invention provides a distress warning device which is possessed of few parts and which therefore is unlikely to get out of order.

Still a further feature of the present invention provides a distress warning device which is of a rugged and durable construction and which therefore may be guaranteed by the manufacturer to withstand many years of intended usage.

Yet still a further feature of the present invention provides a distress warning device which is aesthetically pleasing and refined in appearance while being easy to use and reliable and efficient in operation.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a vehicle having the distress warning device of the present invention temporarily attached thereto;

FIG. 2 is a front elevational view of the distress warning device of the invention illustrated in its fully extended position;

FIG. 3 is a front elevational view of the distress warning device of the invention illustrated in its partially collapsed position;

FIG. 4 is an enlarged fragmentary front elevational view of a portion of the supporting shaft of the distress warning device illustrating details thereof; and FIG. 5 is an enlarged cross-sectional view taken along Lines 5—5 of FIG. 4.

DESCRIPTION OF THE PREFERRED EMBODIMENT

Referring now to the drawings in detail there is illustrated a preferred form of a distress warning device constructed in accordance with the principles of the present invention and which is designated generally in its entirety by the reference numeral 10 and which is comprised of three component parts, namely a suction cup base 11, a telescopic mast or post 12, and a hollow cylindrically shaped signalling member 13.

The suction cup base 11 is of a hollow flexible member, preferably manufactured of rubber, having a flat disc shaped top surface 21 with cylindrical side walls 22 depending downwardly therefrom and terminating at bottom edge 23 with there being defined interiorly thereof a hollow chamber 24 opening out of the bottom end of the suction cup. In use, the suction cup is placed on a flat surface 25 with chamber 24 facing the surface in confronting relationship such that depressions centrally of the suction cup forces air out of the chamber 24 past bottom edges 23 with the resultant vacuum effecting the suction attachment of the suction cup to the surface 25. The suction cup has an overall diameter of about three inches.

The signalling member 13 consists of an elongated hollow cylindrically shaped body member having cylindrically shaped side walls 31 terminating at the top and bottom end in hemi-spherical or dome shaped top and bottom ends 32 and 33 respectively. The exterior surfaces of sidewalls 31, top end 32, and bottom end 33 are coated with a vivid color which is iridescent so as to otherwise of a glowing and colorful nature and to be reflective of light such that it will be highly visible at long distances in both daylight as well as in the night when subjected to light rays striking the same, such as the light rays emitted from the beams of oncoming vehicles. The signal member 13 has an overall length of about 5 inches with the diameter of the cylindrical side walls 31 being about 2½ inches.

The post, mast, or shaft 12 is formed of hollow elongated tubular segments 41, 51 and 61 which are disposed in telescopic relationship relative to each other, segment 41 defining the base segment, segment defining the middle or intermediate segment, with segment 43 defining the top segment. The mast 12 extends between the suction cup base 11 and the bottom end 33 of the signal member 13 to support the signal member on the base. The overall telescopically extended length of the mast 12 is about two feet.

The segment 41 is of an axially elongated cylindrical member having cylindrical side walls 42, a closed bottom end 43, and an open top end 44 with there being an elongated passageway 45 defined interiorly thereof and opening out of the top end thereof. Bottom end 43 is affixed concentric with suction cup base 11 on the top surface 21 thereof with the segment 41 projecting axially upwardly therefrom. A slot 46 extends longitudinally through side wall 42 from a position inwardly of end 43 and terminates at a position inwardly of top end 44 where it is joined with circumferally extending slot 47 which extends at a right angle to the slot 46 and terminates a short distance therefrom. Slots 46 and 47 are of the same width with slot 47 extending horizontally and parallel to top end 44.

Segment 51 is of an axially elongated hollow tubular configuration having cylindrical side walls 52, a bottom end 53, an open top end 54, and a passageway 55 extending completely therethrough interiorly of the side wall 52. The exterior diameter of sidewall 52 is substantially equal to the interior diameter of passageway 45 such that the bottom end portion 53 of segment 51 is telescopically inserted through top end 44 of segment 41 and is axially reciprocally movable relative thereto in a telescoping manner into and out of the same. A slot 56 extends longitudinally through side wall 52 from a position inwardly of bottom end 53 to a position inwardly of top end 54 where the slot is joined to a circumferally extending slot 57 which is the same width as slot 56 and extends at a right angle thereto for a short distance therefrom and parallel to the top end 54.

Extending radially out of side wall 52 at a position adjacent bottom end 53 is a solid rod shaped pin member 58 of a diameter less than the width of slots 46 and 47 and adapted to be received in the slots 46 and 47 to guide the reciprocal telescoping movement of segment 51 relative to segment 41. The pin 58 when in slot 46 permitting axial movement of segment 51 relative to segment 41, with rotation of segment 51 relative to segment 41 effecting engagement of pin 58 in slot 47 to lock the segment 51 in a telescopic extended position relative to segment 41.

Segment 61 is of an elongated hollow tubular configuration having cylindrical side walls 62, a bottom end 63, a top end 64, a passageway 65 extending axially completely therethrough between the sidewalls 62. The exterior diameter of side wall 62 is slightly less than the interior diameter of passageway 55 of segment 51 such that segment 61 is telescopically received in segment 51 for reciprocal telescopic movement inwardly and outwardly thereof through open top end 54.

A pin member 68 projects radially outwardly of side wall 62 in a position adjacent bottom end 63 and is of a diameter to be movably received in slots 56 and 57 of segment 51 and operates therein in the same manner as aforementioned pin 58 in slots 46 and 57 so as to selectively control the telescopic movement of segment 61 between a maximum extended position and a fully collapsed position.

In operation when a distress condition is present, an individual removes the warning device 10 from its position of storage wherein all of the mast segments 41, 51 and 61 are telescopically collapsed inwardly of each other, the individual placing suction cup base 11 on suitable surface 25 and then effecting the telescopic extension of the mast segment to place the signal member 13 in a clearly visible position to warn other individuals of the distress situation.

It is to be understood that the form of this invention herewith shown and described is to be taken as a preferred example of the same and that this invention is not to be limited to the exact arrangement of parts shown in the accompanying drawings or described in this Specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A distress warning device intended for use on vehicles and the like, the device comprising, in combination:

a suction base member consisting of a flat disc shaped top member having an exterior surface, an interior surface, and peripheral circular cylindrical side wall surfaces; cylindrical side wall surfaces; cylindrical side walls depending downwardly from said side edges of said top member and defining an annular ridge surrounding said interior surface; a hollow chamber defined between said annular ridge and said interior surface of said top member and opening out of a base of said suction base member as defined between surrounding bottom edges of said annular ridge; said chamber adapted to have its base portion disposed in confronting relationship with a surface of the vehicle onto which said suction cup member is to be affixed with said bottom edges of said annular ridge engaging said surface; depressing centrally of said exterior surface in a direction inwardly of said chamber expels air from said chamber to create a partial vacuum therein thus detachably mounting said suction cup base member to said surface against which it is applied;

a ringed shaped boss member affixed centrally of said base member exterior surface and extending axially upwardly therefrom and defining a socket therein opening out of a top end thereof;

a hollow cylindrically shaped signal member including cylindrical side walls, a hemi-spherical dome shaped top end surface, and a hemi-spherical dome shaped bottom end surface;

said signal member having an exterior surface extending completely over the side walls and top and bottom ends;

a vivid irridescent color applied completely over the exterior surface of said signal member, said color having high light reflective characteristics providing a high level of visibility both during the daylight hours as well as when illuminated during nighttime hours by light rays falling thereon, such as encountered by headlights of passing vehicles;

a first mast segment consisting of an axially elongated tubular body member having cylindrical side walls, a closed bottom end, an open top end, and a passageway extending axially therethrough opening out of said top end;

a slot extending longitudinally through said side wall of said first segment in communication with said passageway and extending from a position spaced inwardly of said bottom end to a position spaced inwardly of said top end;

a second passageway disposed in said first segment side wall extending normal to said first passageway about a short portion of the circumference of said side wall and parallel to said top end, said second passageway having one end in communication with said first passageway, said first and second passageways each having an identical width;

said bottom end of said first segment being affixed in said socket of said suction cup base member with said first segment projecting vertically outwardly therefrom;

a second mast segment consisting of an axially elongated tubular configuration having cylindrical side walls, a bottom end, a top end, and a passageway extending axially therethrough and opening out of the top end thereof;

the exterior diameter of said second segment being less than the diameter of said first segment passageway with the bottom end portion of said second segment being telescopically received in the top end of said first segment, said second segment being reciprocally movable axially relative to said first segment between a collapsed position disposed inwardly of said first segment and a telescopically extended position extending outwardly of said first segment;

a rod shaped pin member extending radially from said second segment side walls adjacent said bottom end thereof and having a diameter to be slidingly received in said first and second passageways of said first segment for guiding the movement of said second segment relative to said first segment;

a first slot extending longitudinally through said second segment side wall in communication with said passageway therein and extending from a position spaced inwardly of said top end to a position spaced inwardly of said bottom end;

a second slot disposed in said side wall extending normal to said first slot and having one end in communication with said first slot, the second slot extending about a short portion of the circumference of said second segment side wall and parallel to said top end thereof, said second slot being of the same width as said first slot;

a third mast segment being of an axially elongated tubular configuration and consisting of cylindrical side walls, a bottom end, and a top end;

said third segment having an exterior diameter of said cylindrical side walls less than the interior diameter of said second segment passageway with said bottom end of said third segment being telescopically received through said top end of said second segment and movable axially relative thereto between a collapsed position inwardly of said second segment and an extended position extending telescopically outwardly of said second segment;

a rod shaped pin member extending radially outwardly from said third segment cylindrical side wall adjacent said third segment bottom end and having a diameter to be slidingly received in said first and second slots of said second segment for guiding the movement of said third segment relative to said second segment;

said pin members of said third segment and second segment retaining said telescopically extending positions of said segments relative to their respective segments when said pin members are received in said second mentioned slot or passageway of said segments;

said top end of said third segment being affixed centrally of said dome shaped bottom end of said signal member with the longitudinal axis of said mast being in alignment with the axis of said signal member; and whereby said signal member may be telescopically extended by said mast segments to a distance disposed above said section base member to be clearly visible at a lengthy distance therefrom to warn vehicles in the surrounding area of a distress condition.

* * * * *